(No Model.)
R. W. MASKE.
DUST COLLECTOR AND SEPARATOR.
No. 561,599. Patented June 9, 1896.
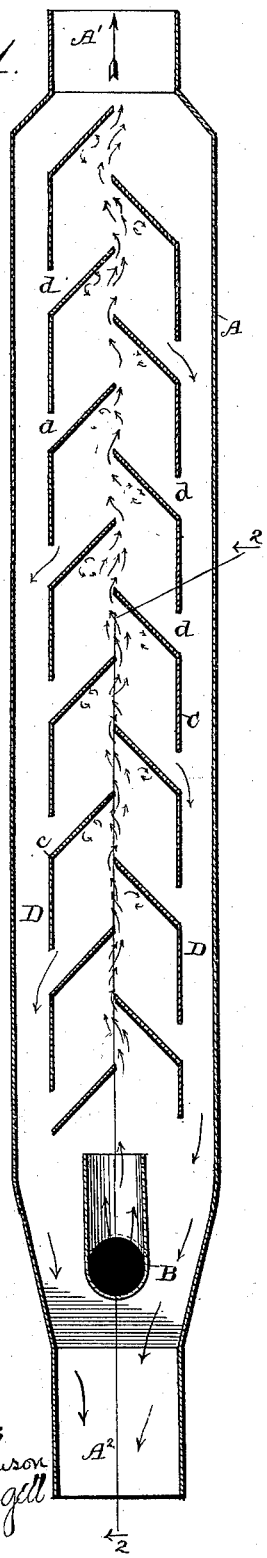
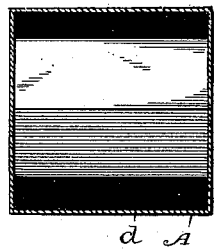
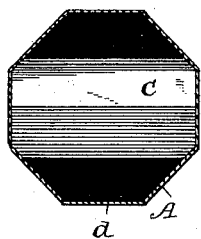
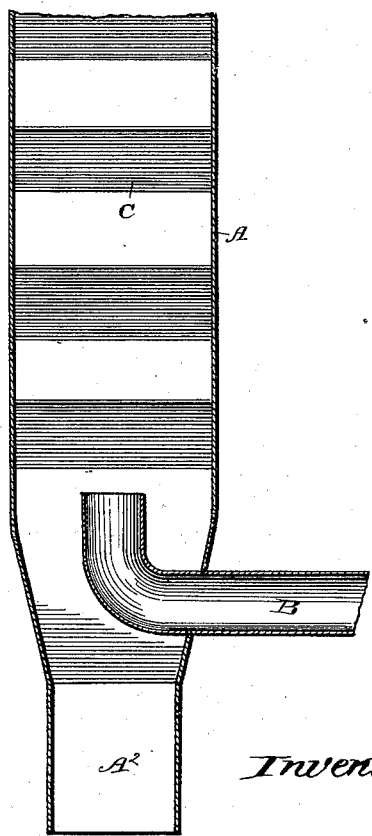
Witnesses
Arthur Johnson
Leslie Daggett
Inventor.
Robert W. Maske

UNITED STATES PATENT OFFICE.

ROBERT W. MASKE, OF CHICAGO, ILLINOIS.

DUST COLLECTOR AND SEPARATOR.

SPECIFICATION forming part of Letters Patent No. 561,599, dated June 9, 1896.

Application filed December 18, 1891. Serial No. 415,458. (No model.)

*To all whom it may concern:*

Be it known that I, ROBERT W. MASKE, of Chicago, Illinois, have invented a new and Improved Dust Collector and Separator, of which the following is a clear and concise description.

My invention relates to machinery for collecting dust, shavings, &c., from flour, saw, planing, and other mills to a central point and there separating the dust, &c., from the air, and relates particularly to the chamber in which the dust particles are separated from the air.

The object of my invention is to provide a separating-chamber in which air, steam, or any gas introduced at a pressure may be separated from dust, shavings, &c., with which the said gas is laden.

While other dust-collectors have been made and operated successfully, I believe I am the first to invent a chamber in which not only dust and shavings can be separated from air, but moisture can be separated from the exhaust-steam of engines, and burning particles can be separated from the hot gases from such furnaces as use a forced air-blast, as will be hereinafter explained.

In the drawings, Figure 1 is a vertical section of a chamber in which my device is embodied in its most preferable form. Fig. 2 is also a vertical section on the line 2 2 of Fig. 1. Fig. 3 is a sectional plan view. Fig. 4 is a sectional plan of a modified shape.

A is the chamber, made preferably square in cross-section, although it may be of any desired shape—as, for instance, that shown in Fig. 4—having outlets A' and A² at top and bottom. B is the inlet through which the dust-laden air, the water-laden steam, or the burning particles carried along with the hot gases from a furnace, as the case may be, are introduced. If used in the last-mentioned case, however, the inlet B would be necessarily vertical and the outlet A² (which is the outlet for the dust, &c.) be shaped in such a manner as to suit the particular circumstances.

The deflector-plates C are placed alternately at each side of what I will term, for convenience, the "line of blast," which is the path the blast of air or steam would naturally take from the inlet B to the upper outlet A'. The deflector-plates may set at any desired angle, but that shown in the drawings is the most preferable, because it has been proved in my experiments to be the best adapted to shed the dust particles, &c., and the distance they extend over the line of blast is determined by the weight of the particles to be separated from the air or gas. For instance, the deflector-plates are shown in Fig. 1 as extending directly over the line of blast, causing the blast of air to take a course indicated by short arrows, and are thus made when designed to separate light particles, such as sawdust, shavings, &c., from the air.

If the separator was designed for use on furnaces, the deflector-plates need not extend up to the line of blast, but may be made so that the hot gases may go straight up, the separation depending on the "showering" effect of a blast laden with heavy particles. The deflector-plates extend across the whole width of the chamber, as shown in Fig. 2, and extend in the direction, as shown in Fig. 1, to a point $c$, from whence they further extend vertically down to within a short distance from the deflector-plate immediately below it, forming practically a passage D on each side, having apertures $d$.

The operation is as follows: The particle-laden gas or air is introduced through the inlet B, and naturally takes an upward direction toward the outlet A'. The particles striking the deflector-plates are, if light, forced by air-eddies, as indicated by the small arrows, and, if heavier, carried by gravity downward toward the apertures $d$ and pass into the passages D and downward to the outlet A².

The object of having a number of deflector-plates is that the blast, being at the outset comparatively strong, is apt to carry along the finer particles and becoming weaker as it rises and expands the upper deflector-plates catch the finer particles.

It will be seen that the blast is allowed to take a natural course and that the direction of the line of blast in my invention is never changed, thus obviating all back pressure, which is dangerous in the case of gases and which detracts from the usefulness of the engine, if it occurs in connection therewith, and that, this being a fact, the chamber can be made much smaller than formerly, thus decreasing the cost of manufacture.

The chamber can be set at an angle, if desired, and the angle of the deflector-plates changed to suit the circumstances.

What I claim as my invention, and wish to secure by Letters Patent, is—

1. The combination of a vertical chamber having an outlet at the top for the escaping air and an outlet at the bottom for the separated dust, and having an inlet located near the bottom for the dust-laden air, combined with stationary angle-shaped plates that form deflectors for the air-current, and form passages at two sides of said chamber down which the separated dust falls, the said plates being secured to the two other sides of said chamber and so arranged relative to each other that the air-current strikes first one and then the other plate or plates, the portions of said plates which form the dust-passage in such relative position to each other as to provide openings into said dust-passage, substantially as described.

2. In a dust collector and separator a vertical chamber having an opening at the top through which the separated air escapes, and an opening at the bottom through which the separated dust escapes in combination with a pipe through which the particle-laden air is forced into the bottom of said chamber, two series of stationary angle-shaped deflector-plates placed so that the air-current passes between them and is alternately deflected from one member of the series to the succeeding member of the other, the vertical members of the said deflector-plates forming dust-passages on each side of the line of the passage of the air-current, down which space the said separated dust falls, the vertical members of the said plates provided with openings through which the dust can escape into the said passages, substantially as described.

ROBERT W. MASKE.

Witnesses:
ARTHUR JOHNSON,
LESLIE M. DAGGETT.